US006422724B1

(12) United States Patent
Monteiro

(10) Patent No.: US 6,422,724 B1
(45) Date of Patent: Jul. 23, 2002

(54) PORTABLE LIGHT DEVICE FOR VEHICLES

(76) Inventor: Robert A. Monteiro, 130 Amanda Ave., New Bedford, MA (US) 02745

(*) Notice: Subject to any disclaimer, the term of this patent is extended or adjusted under 35 U.S.C. 154(b) by 0 days.

(21) Appl. No.: 09/569,631

(22) Filed: May 12, 2000

(51) Int. Cl.[7] .................................................. B60Q 1/00

(52) U.S. Cl. ....................... 362/486; 362/487; 362/523; 362/528; 362/191; 362/207; 362/398; 362/419; 362/427

(58) Field of Search ................................ 362/486, 487, 362/493, 496, 506, 523, 528, 191, 198, 199, 207, 310, 311, 398, 419, 421, 422, 427, 430, 455, 457; 248/206.5

(56) References Cited

U.S. PATENT DOCUMENTS 3,666,938 A * 5/1972 Dolega ....................... 362/398
4,238,816 A 12/1980 Merlo
4,325,107 A * 4/1982 MacLeod .................... 362/183
4,430,638 A 2/1984 Parker
4,506,317 A * 3/1985 Duddy ....................... 362/396
4,533,984 A * 8/1985 Gatton ....................... 362/232
4,564,894 A 1/1986 Gonzalez
5,136,477 A * 8/1992 Lemmey ..................... 362/198
5,389,942 A * 2/1995 Oglesby, Jr. ................ 343/872
5,457,619 A 10/1995 Ewing
5,521,803 A * 5/1996 Eckert et al. ............... 362/198
D392,760 S 3/1998 Wu

* cited by examiner

*Primary Examiner*—Thomas M. Sember
*Assistant Examiner*—David V. Hobden

(57) ABSTRACT

A portable light device for vehicles for providing useful and needed light when working with or about a vehicle. The portable light device for vehicles includes includes a magnetic base member; and also includes an elongate contortable member having a first end and a second end with the first end being securely fastened to the magnetic base member; and further includes a support member being securely and pivotally attached to the second end of the elongate contortable member and having a first portion and a second portion which is rotatably mounted upon the first portion with the second portion also including a top wall and a recessed portion in the top wall; and also includes light-emitting assembly.

10 Claims, 3 Drawing Sheets

PORTABLE LIGHT DEVICE FOR VEHICLES

BACKGROUND OF THE INVENTION

1. Field of the Invention

The present invention relates to a magnetic car light and more particularly pertains to a new portable light device for vehicles for providing useful and needed light when working with or about a vehicle.

2. Description of the Prior Art

The use of a magnetic car light is known in the prior art. More specifically, a magnetic car light heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,238,816; U.S. Pat. No. 3,666,938; U.S. Pat. No. Des. 392,760; U.S. Pat. No. 5,457,619; U.S. Pat. No. 4,430,638; and U.S. Pat. No. 4,564,894.

While these devices fulfill their respective, particular objectives and requirements, the aforementioned patents do not disclose a new portable light device for vehicles. The inventive device includes a magnetic base member; and also includes an elongate contortable member having a first end and a second end with the first end being securely fastened to the magnetic base member; and further includes a support member being securely and pivotally attached to the second end of the elongate contortable member and having a first portion and a second portion which is rotatably mounted upon the first portion with the second portion also including a top wall and a recessed portion in the top wall; and also includes light-emitting assembly.

In these respects, the portable light device for vehicles according to the present invention substantially departs from the conventional concepts and designs of the prior art, and in so doing provides an apparatus primarily developed for the purpose of providing useful and needed light when working with or about a vehicle.

SUMMARY OF THE INVENTION

In view of the foregoing disadvantages inherent in the known types of magnetic car light now present in the prior art, the present invention provides a new portable light device for vehicles construction wherein the same can be utilized for providing useful and needed light when working with or about a vehicle.

The general purpose of the present invention, which will be described subsequently in greater detail, is to provide a new portable light device for vehicles which has many of the advantages of the magnetic car light mentioned heretofore and many novel features that result in a new portable light device for vehicles which is not anticipated, rendered obvious, suggested, or even implied by any of the prior art magnetic car light, either alone or in any combination thereof.

To attain this, the present invention generally comprises includes a magnetic base member; and also includes an elongate contortable member having a first end and a second end with the first end being securely fastened to the magnetic base member; and further includes a support member being securely and pivotally attached to the second end of the elongate contortable member and having a first portion and a second portion which is rotatably mounted upon the first portion with the second portion also including a top wall and a recessed portion in the top wall; and also includes light-emitting assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable light device for vehicles which has many of the advantages of the magnetic car light mentioned heretofore and many novel features that result in a new portable light device for vehicles which is not anticipated, rendered obvious, suggested, or even implied by any of the prior art magnetic car light, either alone or in any combination thereof.

It is another object of the present invention to provide a new portable light device for vehicles which may be easily and efficiently manufactured and marketed.

It is a further object of the present invention to provide a new portable light device for vehicles which is of a durable and reliable construction.

An even further object of the present invention is to provide a new portable light device for vehicles which is susceptible of a low cost of manufacture with regard to both materials and labor, and which accordingly is then susceptible of low prices of sale to the consuming public, thereby making such portable light device for vehicles economically available to the buying public.

Still yet another object of the present invention is to provide a new portable light device for vehicles which provides in the apparatuses and methods of the prior art some of the advantages thereof, while simultaneously overcoming some of the disadvantages normally associated therewith.

Still another object of the present invention is to provide a new portable light device for vehicles for providing useful and needed light when working with or about a vehicle.

Yet another object of the present invention is to provide a new portable light device for vehicles which includes includes a magnetic base member; and also includes an elongate contortable member having a first end and a second end with the first end being securely fastened to the magnetic base member; and further includes a support member being securely and pivotally attached to the second end of the elongate contortable member and having a first portion and a second portion which is rotatably mounted upon the first portion with the second portion also including a top wall and a recessed portion in the top wall; and also includes light-emitting assembly.

Still yet another object of the present invention is to provide a new portable light device for vehicles that can be easily and conveniently positioned as desired by the user.

Even still another object of the present invention is to provide a new portable light device for vehicles that can be easily and quickly set up for use with and about a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
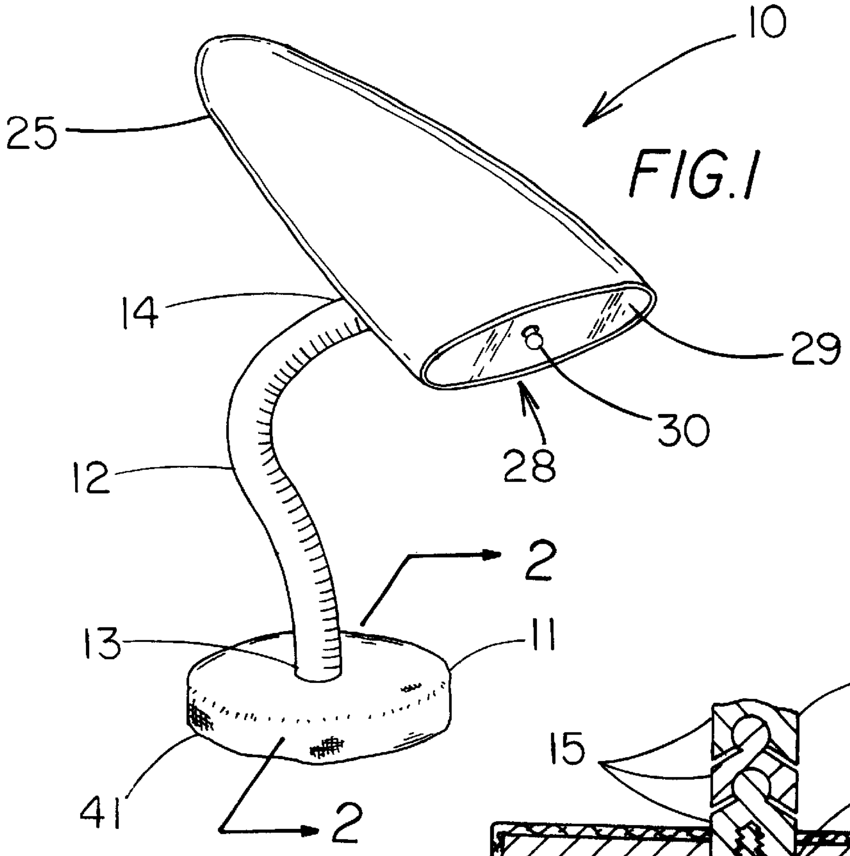
FIG. 1 is a perspective view of a new portable light device for vehicles according to the present invention.
Figure 2:
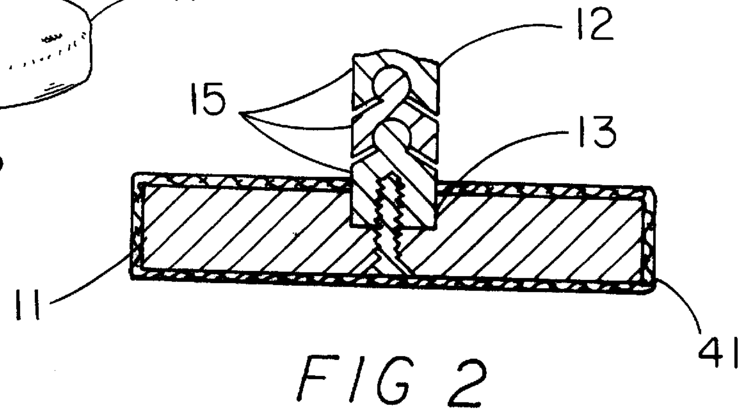
FIG. 2 is a cross-sectional view of base member of the present invention.
Figure 7:
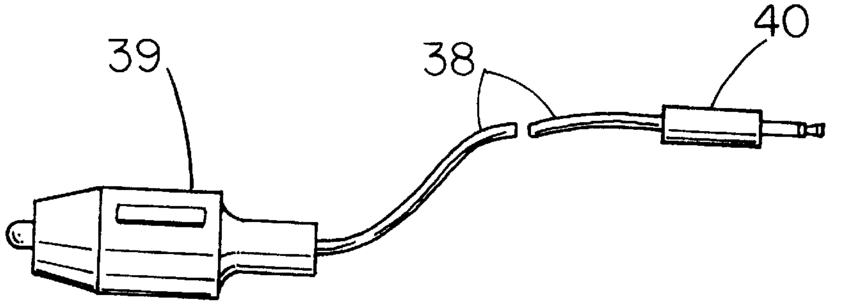
FIG. 7 is a side elevational view of the power cord of the present invention.
Figure 3:
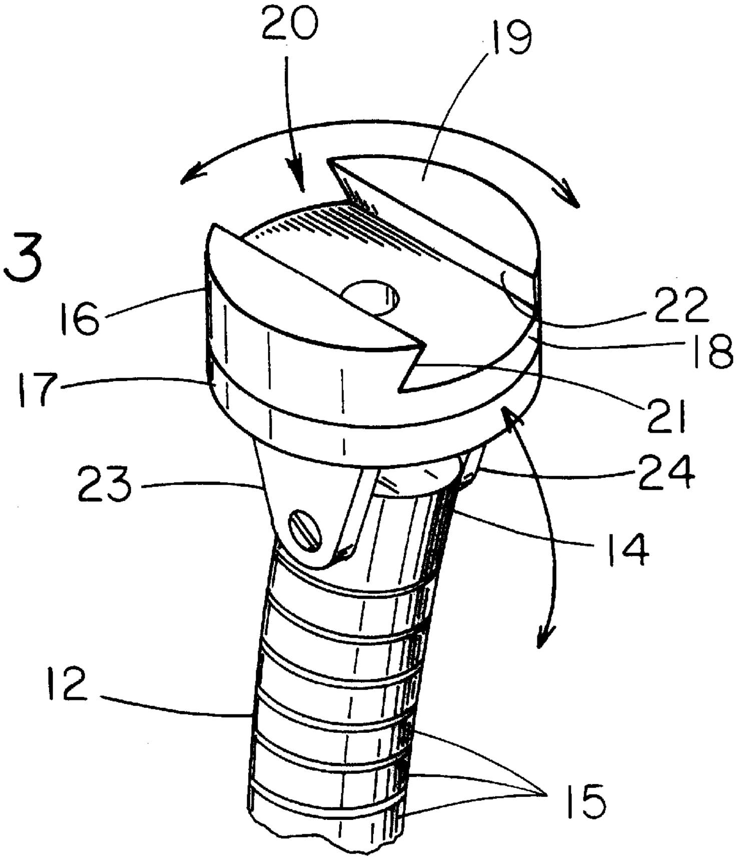
FIG. 3 is a detailed perspective of the support member of the present invention.
Figure 4:
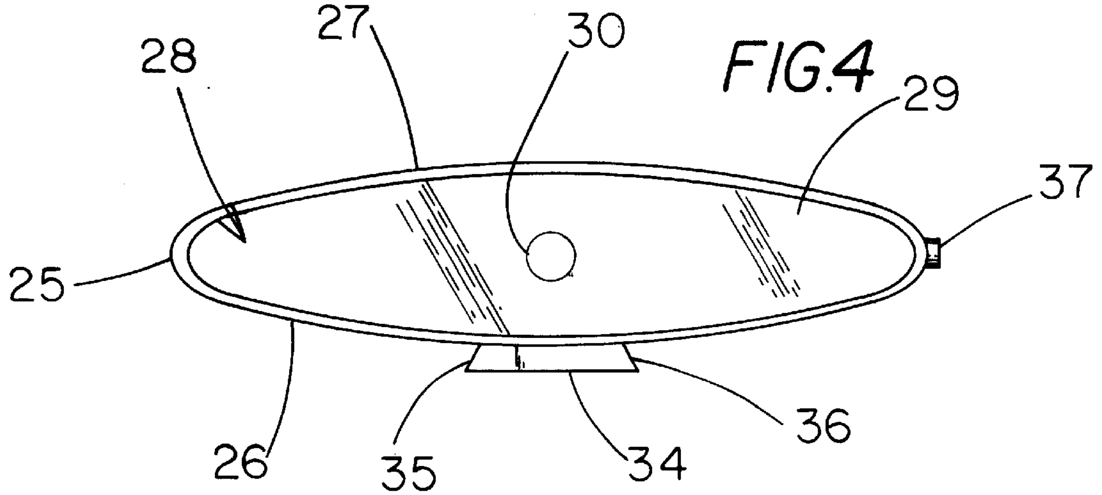
FIG. 4 is a front elevational view of the housing and boss-like member of the present invention.
Figure 5:
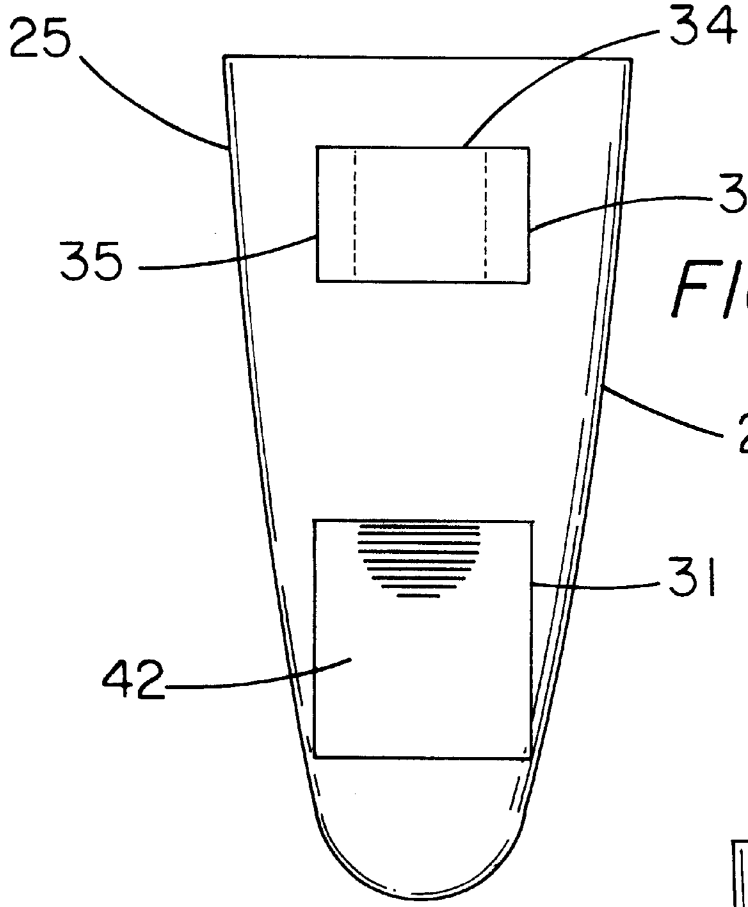
FIG. 5 is a bottom plan view of the housing of the present invention.
Figure 6:
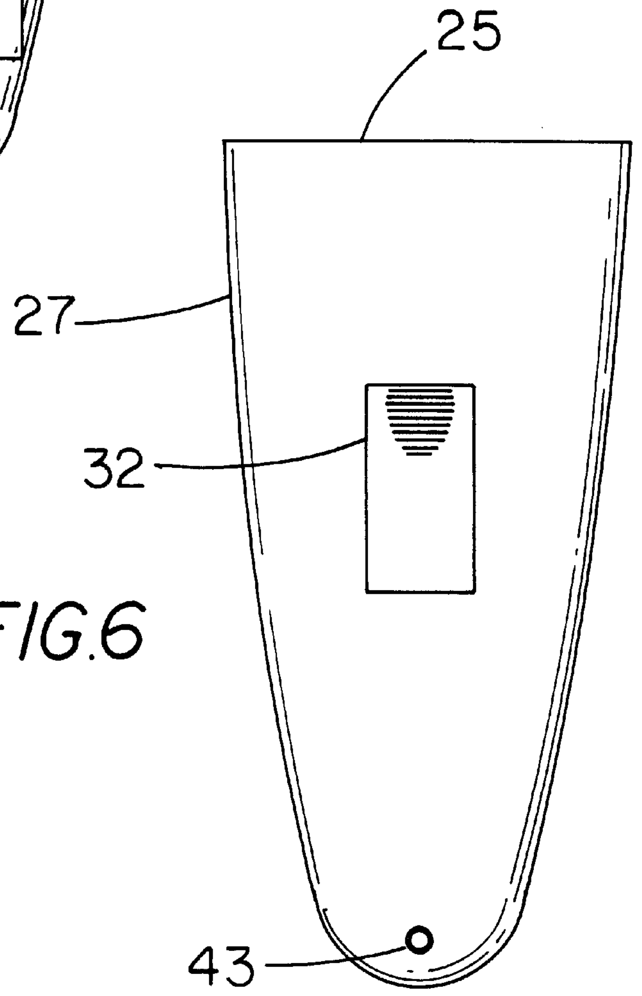
FIG. 6 is a top plan view of the housing of the present invention.

With reference now to the drawings, and in particular to FIGS. 1 through 7 thereof, a new portable light device for vehicles embodying the principles and concepts of the present invention and generally designated by the reference numeral 10 will be described.

As best illustrated in FIGS. 1 through 7, the portable light device for vehicles 10 generally comprises a magnetic base member 11 including a cloth cover 41 securely and conventionally disposed about the magnetic base member 11 with the magnetic base member 11 being essentially disc-shaped and having a diameter of approximately 5 inches and a thickness approximately ¾ inches. The portable light device 10 also includes an elongate contortable member 12 having a first end 13 and a second end 14 with the first end 12 being securely and conventionally fastened to the magnetic base member 11. The elongate contortable member 12 also includes a plurality of spine-like articulating members 15 connected end-to-end. A support member 16 is securely, pivotally and conventionally attached to the second end 14 of the elongate contortable member 12 and has a first portion 17 and a second portion 18 which is rotatably mounted upon the first portion 17. The second portion 18 also includes a top wall 19 and a recessed portion 20 in the top wall 19. The support member 16 includes bracket members 23,24 integrally extending from the first portion 17 thereof and being adapted to fasten to the elongate contortable member 12. A means for emitting a beam of light includes a housing 25 having a bottom wall 26, an open front 28, and a storage compartment 32 for storing spare light-emitting members 30; and also includes a boss-like member 34 securely and conventionally disposed upon an exterior of the bottom wall 26 and being removably and securely received in the recessed portion 20 of the support member 16; and further includes a light-emitting member 30 securely and conventionally disposed in the housing 25; and also includes a switch 37 securely and conventionally disposed upon the housing 25 and being connected to the light-emitting member 30; and also includes a transparent cover 29 securely and conventionally disposed at the open front 28; and further includes a means for energizing the light-emitting member 30. The boss-like member 34 includes side walls 35,36 and is tapered outwardly from the bottom wall 26 of the housing 25 to a bottom of the boss-like member 34 with the sides walls 35,36 of the boss-like member 34 being slanted outwardly from the bottom wall 26 of the housing 25 to the bottom of the boss-like member 34. The recessed portion 20 of the support member 16 includes side walls 21,22 which are slanted inwardly from a bottom of the recessed portion 20 to a top of the recessed portion 20 with the recessed portion 20 being adapted to removably and securely receive the boss-like member 34.

As a first embodiment, the means for energizing the light-emitting member 30 includes the housing 25 having a battery compartment 31 conventionally disposed therein, a battery 42 removably disposed in the battery compartment 31 through the bottom wall 26 thereof and being connected to the switch 37.

As a second embodiment, the means for energizing the light-emitting member 30 includes a power cord jack 43 conventionally disposed in a top wall 27 of the housing 25 and being conventionally connected to the light-emitting member 30, and also includes a power cord 38 having a cigarette lighter adapter plug 39 securely and conventionally attached at one end thereof and also having a jack adapter plug 40 securely and conventionally attached at another end thereof and being adapted to be removably received in the power cord jack 43.

In use, the user places the magnetic base member 11 upon the metal surface of a vehicle where it is needed and manipulates the elongate contortable member 12 so as to shine light upon the area where it is needed. If a battery 42 is being used, the user only need to turn on the switch 37 to energize the light-emitting member 30. If the power from the vehicle is being used, the user plugs the power cord 38 into the cigarette lighter and into the power cord jack 43 and turns on the switch 37 to energize the light-emitting member 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable light device for vehicles comprising:

a magnetic base member including a cloth cover disposed about said magnetic base member;

an elongate contortable member having a first end and a second end, said first end being fastened to said magnetic base member;

a means for emitting a beam of light; and a support member pivotally connecting said second end of said elongate contortable member to said means for emitting a beam of light for permitting pivoting of said means with respect to said elongate contortable member about a first axis, said support member having a first portion and a second portion which is rotatably mounted upon said first portion to permit rotation of said means with respect to said elongate contortable member about a second axis, said second axis being oriented substantially perpendicular to said first axis, said second portion also including a top wall and a recessed portion in said top wall;

wherein said means for emitting a beam of light includes:

a housing having an open front and a closed rear;

a boss member disposed upon an exterior of said bottom wall and being removably received in said recessed portion of said support member;

a light-emitting member disposed in said housing;

a switch disposed upon said housing and being connected to said light-emitting member; and a transparent cover disposed at said open front;

a means for energizing said light-emitting member; and wherein said housing includes a perimeter wall extending between said open front and said closed rear, said housing having a longitudinal axis extending between said closed rear and said open front, a forward edge of said perimeter wall defining said open front, said forward edge defining an elongated oval shape, transverse cross sections of said perimeter wall along said longitudinal axis each having an elongated oval shape, said perimeter wall converging toward said closed rear and diverging toward said open front for facilitating insertion ands holding said closed rear of said housing in a mouth of a user for directing said beam of light from said open front.

2. A portable light device as described in claim 1, wherein said boss member includes side walls and said sides walls are slanted outwardly from said bottom wall of said housing to said bottom of said boss-like member.

3. A portable light device as described in claim 2, wherein said recessed portion of said support member includes side walls which are slanted inwardly from a bottom of said recessed portion to a top of said recessed portion, said recessed portion removably receiving said boss member.

4. A portable light device as described in claim 1, wherein said support member includes bracket members extending from said first portion thereof and being fastenable to said elongate contortable member.

5. A portable light device as described in claim 1, wherein said elongate contortable member includes a plurality of spine-like articulating members connected end-to-end.

6. A portable light device as described in claim 1, wherein said means for energizing said light-emitting member includes a battery compartment disposed in said housing, and a battery removably disposed in said battery compartment through said bottom wall thereof and being connected to said switch.

7. A portable light device as described in claim 1, wherein said means for energizing said light-emitting member includes a power cord jack disposed in a top wall of said housing and being connected to said light-emitting member, and also includes a power cord having a cigarette lighter adapter plug securely attached at one end thereof and also having a jack adapter plug securely attached at another end thereof for being removably received in said power cord jack.

8. A portable light device for vehicles comprising:

a magnetic base member including a cloth cover disposed about said magnetic base member, said magnetic base member being essentially disc-shaped and having a diameter of approximately 5 inches and a width of approximately ¾ inches;

an elongate contortable member having a first end and a second end, said first end being securely fastened to said magnetic base member, said elongate contortable member including a plurality of spine-like articulating members connected end-to-end;

a support member being securely and pivotally attached to said second end of said elongate contortable member and having a first portion and a second portion which is rotatably mounted upon said first portion, said second portion also including a top wall and a recessed portion in said top wall, said support member including bracket members extending from said first portion thereof and being fastenable to said elongate contortable member; and a means for emitting a beam of light including a housing including a housing having an open front, a closed rear, and a perimeter wall extending between said open front and said closed rear, said housing having a longitudinal axis extending between said closed rear and said open front, a forward edge of said perimeter wall defining said open front, said forward edge defining an elongated oval shape, transverse cross sections of said perimeter wall along said longitudinal axis each having an elongated oval shape, said perimeter wall converging toward said closed rear and diverging toward said open front for facilitating insertion ands holding said closed rear of said housing in a mouth of a user for directing said beam of light from said open front, said perimeter wall of said housing including a bottom wall, said housing having a storage compartment for storing spare light-emitting members; and also includes a boss-like member securely disposed upon an exterior of said bottom wall and being removably and securely received in said recessed portion of said support member; and further includes a light-emitting member securely disposed in said housing; and also includes a switch securely disposed upon said housing and being connected to said light-emitting member; and also includes a transparent cover securely disposed at said open front; and further includes a means for energizing said light-emitting member, said boss-like member including side walls being slanted outwardly from said bottom wall of said housing to said bottom of said boss-like member, said recessed portion of said support member including side walls which are slanted inwardly from a bottom of said recessed portion to a top of said recessed portion, said recessed portion removably receiving said boss-like member.

9. A portable light device as described in claim 8, wherein said means for energizing said light-emitting member includes a battery compartment disposed in said housing, and a battery removably disposed in said battery compartment through said bottom wall thereof and being connected to said switch.

10. A portable light device as described in claim 8, wherein said means for energizing said light-emitting member includes a power cord jack disposed in a top wall of said housing and being connected to said light-emitting member, and also includes a power cord having a cigarette lighter adapter plug securely attached at one end thereof and also having a jack adapter plug securely attached at another end thereof for being removably received in said power cord jack.

* * * * *